Oct. 28, 1969     J. C. MONTGOMERY     3,474,744

PALLET CONSTRUCTION

Filed Jan. 5, 1968

Jack C. Montgomery,
INVENTOR.

BY

C. A. Phillips
ATTORNEY.

United States Patent Office 3,474,744
Patented Oct. 28, 1969

3,474,744
PALLET CONSTRUCTION
Jack C. Montgomery, Hartselle, Ala.
(515 Carolyn St., Decatur, Ala. 35601)
Filed Jan. 5, 1968, Ser. No. 695,905
Int. Cl. B65d 19/26
U.S. Cl. 108—51                        1 Claim

ABSTRACT OF THE DISCLOSURE

A woodscrew anchoring structure for pallet construction employing a conventional woodscrew and a deformable A shape locking member, which, when driven into a pallet member, deforms to conform to, and finally comes to rest in, the slot of the woodscrew, and the ends of the locking member being driven into the pallet member at an angle corresponding to the original A configuration.

---

This invention relates to anchoring structures and particularly to anchoring structures for joining wooden members of a pallet and wherein portions of the wooden members are gripped by one or more woodscrews.

The problem of the loosened nail and screw in joints between wooden members is generally regarded as solvable, if at all, by using more or larger nails or screws. The problem is particularly acute where the structures involved are subject to rough usage and where portions of the structures adjacent woodscrews are subjected to severe twisting or pulling strains. While in many applications it is possible, feasible and practical to design a structure so that the problem is minimized, as by the use of extra large wooden members and through the use of additional nails or screw fasteners, such is not reliably the case in the construction of wooden pallets.

Pallets, with respect to which the applicant refers, are of the type used in warehouses for storage and movement of merchandise and he has found that for several reasons satisfactory construction of them through the use of conventional nails or woodscrews cannot be achieved. For one thing, the use of additional such fasteners in line for added support can cause splitting; two, the pallet industry is a very competitive industry and by doubling the number of fasteners to achieve a more rigid structure would almost double labor costs; and three, conventional fasteners alone will still loosen under typical pallet usage conditions.

It is, accordingly, the object of the present invention to provide an improved pallet wherein the members are more securely fastened together.

It is a further object of this invention to generally provide a long life anchoring structure employing a conventional woodscrew.

In accordance with the invention, and particularly in the construction of pallets, rigid joints between workpieces are joined with woodscrews of the type having a conventional tapered head and wherein the screw head countersinks as the screw is tightened.

A deformable locking pin is constructed of an A shape and of a dimension wherein the ends extend within the ends of the slot in the woodscrew and slightly through it so that the ends extend slightly into the wood. The pin is then driven and the ends continue into the wood at or near the angle of the A shape pin until the intermediate portion of the pin flattens into the slot of the screw. In this fashion the head is locked from rotation and tends to hold the screw fast.

Figure 1:
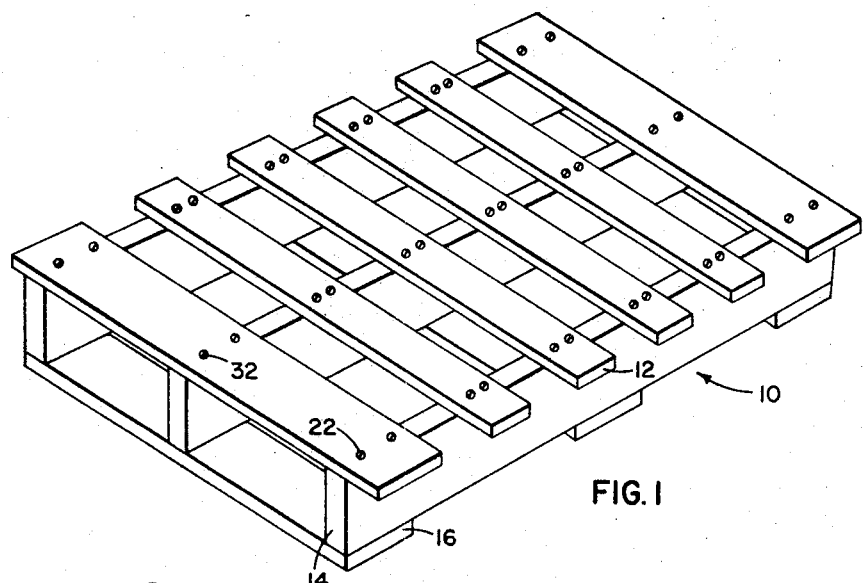
Figure 2:
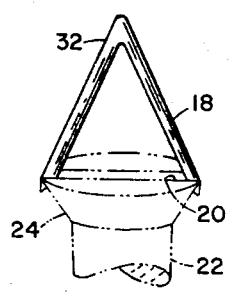
Figure 3:
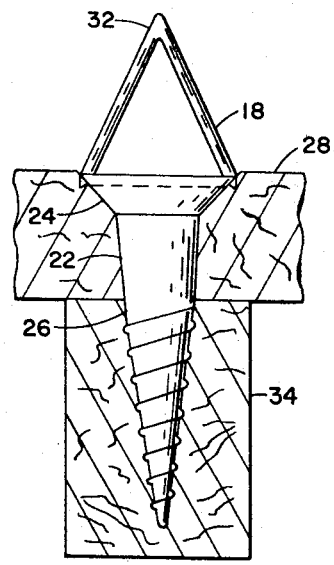
Figure 4:
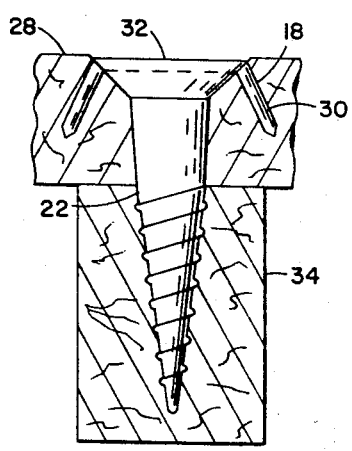

These and other objects, features and advantages of the invention will become more apparent from the following description when considered together with the drawings in which:

FIG. 1 is a perspective view of a pallet;
FIG. 2 is a perspective view of a woodscrew and locking pin;
FIG. 3 is a sectional view of a complete anchoring structure prior to the entry of the locking pin into the top wooden member of the structure; and
FIG. 4 is a sectional view of a complete anchoring structure after the entry of the locking pin into the top wooden member of the structure.

Referring to the drawings, and initially to FIG. 1, there is shown a pallet 10 constructed of three layers of board members. The boards 12 of the top layer of boards are spaced approximately a board apart and are screwed to three center layer boards, or stringers 14, which run transverse to the boards of the top layer. The center layer boards are of thicker construction and to them are screwed three spaced bottom layer boards 16. In each instance the screw type anchoring structure is as illustrated in FIG. 4.

FIG. 2 shows a locking pin in relation to slot 20 of woodscrew 22. Woodscrew 22 is a conventional screw as more completely shown in FIGS. 3 and 4 with a conical head 24 and a tapered or conical body 26. Slot 20 is of uniform depth from side to side of the conical head 24 of woodscrew 22. It is to be noted that locking pin 18 is of an A shape configuration and that the ends are positioned in and slightly through the ends of the groove of the screw into top nailable structure 28, e.g. a top board 12 of FIG. 1. Locking pins 18 are generally chosen in the range of .7 to 1.4 times the diameter of the screw head. An optimum ratio exists when each side or leg of the A pin is approximately equal to the screw head diameter. If the pins are made with legs of shorter length the angle of entrance flattens and there is a tendency for the pins to split out or to be of insufficient length to hold. If the leg lengths are made significantly longer they tend to break at the apex when driven or, when this does not occur, there is a tendency for the pin to pull out because of insufficient wedging angle. Thus when locking pin 18 is driven down as shown in FIG. 4, it grips structure 28 and the ends do not spread so that the end portions 30 of locking pin 18 continue into the structure at substantially the original A angle of locking pin 18. The center portion 32 of locking pin 18 deforms and collapses into slot 20 where it rigidly secures screw 22 to structure 28 and thus locking structures 28 and 34 rigidly together. The head of the screw is then approximately flush with the top surface of board member or nailable structure 28. As shown the head of the screw is usually slightly below the surface of board member 28. Pallets made in this fashion have an increased life of two to three times those made by conventional methods.

It is to be appreciated that the pallet construction and other applications of the invention may differ from the forms illustrated herein.

I claim:
1. A pallet for supporting containers for movement and storage comprising a plurality of spaced top boards, a plurality of spaced intermediate boards positioned transverse to said top boards, and a plurality of spaced bottom boards positioned parallel to said top boards and wherein said top boards are joined to said intermediate boards and said bottom boards are joined to said intermediate boards and wherein at least one of said other boards by an anchor structure consisting of:
(A) a conventional woodscrew having a conical head and a diametrical slot of uniform depth and width formed in the top face of said head, said screw connecting one board of the said top and bottom boards and on intermediate board, with the top face of said screw being approximately flush with the top surface of said board; and

(B) a deformable locking member normally of an A shape, the ends of said locking member being of reduced cross section and spaced to extend slightly through the ends of said slot and upon being driven the end portions of said locking member entering said one board at the angle of the legs of said A shape and the intermediate portion of the locking member bending to conform with and finally coming to rest within said slot.

References Cited

UNITED STATES PATENTS

| | | | |
|---|---|---|---|
| 863,183 | 8/1907 | Jackson et al. | 151—68 |
| 922,072 | 5/1909 | Aichman | 151—68 |
| 1,777,694 | 10/1930 | Halteman | 108—51 XR |
| 2,972,463 | 2/1961 | Matthews et al. | 108—54 |
| 3,039,726 | 6/1962 | Woodward | 108—57 |

FOREIGN PATENTS

| | | |
|---|---|---|
| 166,640 | 8/1950 | Austria. |
| 565,144 | 1/1924 | France. |

OTHER REFERENCES

Ozuka, published May 11, 1943, Ser. No. 382,653, 151—41.74.

BOBBY R. GAY, Primary Examiner

GLENN O. FINCH, Assistant Examiner